United States Patent Office 3,383,220
Patented May 14, 1968

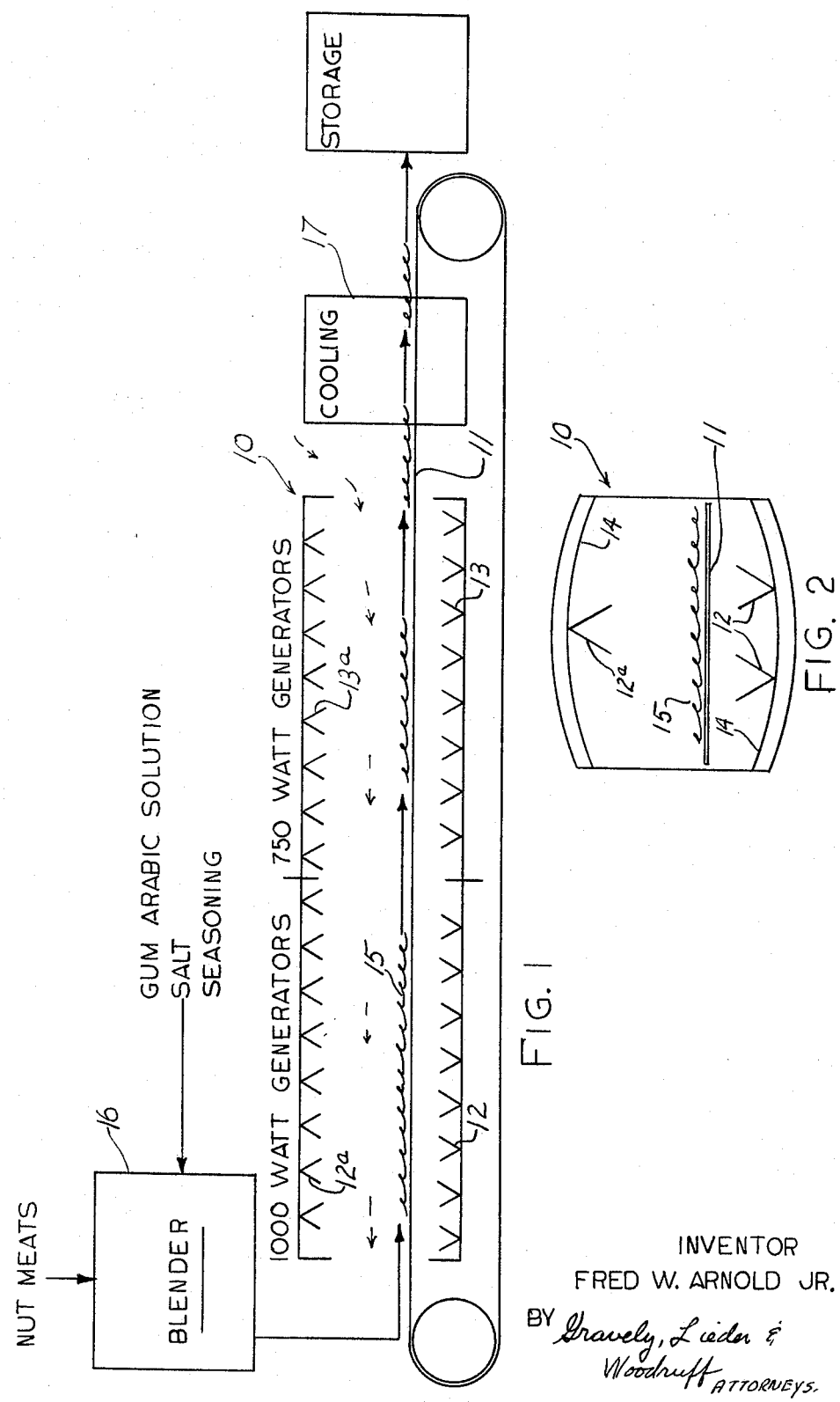
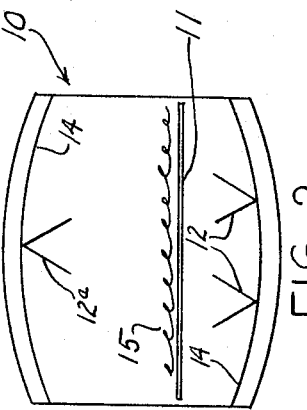

3,383,220
INFRARED ROASTING OF COATED NUTMEATS
Fred W. Arnold, Jr., Eastman, Ga., assignor to Pet Incorporated, a corporation of Delaware
Filed Mar. 15, 1965, Ser. No. 439,689
5 Claims. (Cl. 99—127)

ABSTRACT OF THE DISCLOSURE

A method of roasting pecan nutmeats in which the green pecans are coated with a protective film of gum arabic, salt and spices in a rotating pan, and deposited on an open mesh type moving belt and moved through an infrared tunnel in which infrared heat is applied from above and below the belt to roast the pecans and dry the film simultaneously. The product from the tunnel is a roasted pecan having a protective film adhering flavorings to the nutmeat and having a moisture content of 0.3–0.8%.

Background of the invention

This invention relates to a food process, and particularly to a dry roast process for nutmeats (containing no sugar or oils) but having a protective film of vegetable gum (gum arabic), salt and spices. This coating retards rancidity of the nut oils, and makes a more palatable nutmeat which can be eaten without the heretofore inherent disadvantages of nuts, namely the tendency to make consumers' fingers greasy and to stain articles that come in contact with the nuts. This invention further relates to the use of an infrared tunnel or oven which both conditions and cures the coating and nut under a low ambient heat with no appreciable loss of volatile aromatic oils which are developed and retained in the protective coating.

Description of the prior art

In the usual methods of preparation of nuts for the market, the shelled nut meats are cooked or roasted in an edible oil or dry roasted in convection heat roasters. The roasted nuts are then coated again in an edible oil or fat and salted. The resultant product has many disadvantages. The coating required for the adherence of the salt makes for a greasy product so that consumers' fingers become oily and articles in contact with nuts become stained. This oil coating in itself does not hold the salt securely, and upon handling, the salt tends to settle to the bottom of the package. Thus the nuts at the top of the package have too little salt and those at the bottom have too much.

Summary of the invention

The present invention comprises a process of roasting and coating nutmeats without breaking including taking delicately flavored, fragile, whole pecan nut halves, coating them in their raw shelled state with a protective coating of vegetable gum (gum arabic) salt, and spices, and passing the coated nuts through a controlled infrared tunnel or oven at a regulated forward speed on a stainless steel wire mesh belt with no other agitation.

The invention further consists in the processes hereinafter described and claimed, and in the nutmeats made by said processes.

The primary aims of this invention are to produce:

First: A dry roasted whole pecan half with a unique and crispy piquant taste, retaining the sweet aromatic oils so characteristic of the pecan.

Second: To seal in these nut oils in a crisp protective film against rancidity by processing through an infrared tunnel with a very elastic coating so that as the pecans progress through the oven, the film is able to expand with the formation of certain aromatical oils and lock the oils in, before the final crispy stage is reached at the terminal end of the oven. Cashews, peanuts, almonds and other nuts and seeds (such as sunflower, pinen, etc.) are all adapted to the foregoing method with certain variations.

Description of the drawings

In the accompanying drawings:
FIG. 1 is a schematic side view of the present process and apparatus, and
FIG. 2 is a schematic vertical sectional view through the oven shown in FIG. 1.

Detailed description

The timing and control of the roasting operation is important, as by this means the conditioning may be prolonged or shortened as the occasion demands to accommodate the processing of different kinds of nutmeats. Furthermore, the protective coating of vegetable gum and spices becomes a crisp coating in an ascending degree; beginning at the entrance of the tunnel or oven as an elastic film which holds in the volatile aromatic nut oils until full crispness has been reached at the point of delivery, where cool air is drawn through the nuts completing the cycle with very little or no breakage of the pecans. In all other methods known to me the pecans, when subjected to any brisk motion, quickly break before reaching the desired phase for crispness.

In other not so delicate nutmeats, such as peanuts, a partial dehydration in a conventional commercial roasting unit (such as a Bauer Gas Fired Unit) is accomplished in order to reduce moisture content of the dehydrated nutmeats to about 2.0%. From observation the longest portion of a roasting period effects a dehydration of nutmeats with very little, if any, attendant real roasting thereof, and that the final and relatively short phase of the cycle will bring about rapid roasting. This preliminary or dehydrating phase of the cycle will vary in length of time depending on the condition of the nutmeats which are affected by age, variety, and moisture content.

In carrying out the process of this invention, with particular reference to pecans, a number of factors must be taken into consideration. The revolving pan in which nuts are coated with vegetable gum, salt and spices is to be rotated at a speed where tumbling action provides a continual reintroduction of surfaces to be coated. Thus if the pan is operating at too slow a speed, the component of centrifugal force will be insufficient to elevate the nuts to be properly coated, such that it will not tumble the nuts downward. On the other hand, if the pan is rotated too fast, frictional forces tend to counterbalance the force of fravity so that tumbling action is not provided and as a result effective fixation of the coating on the nuts is not obtained. This balance is found to be about 18 r.p.m. (revolutions per minute) for pecans, depending on the size of the pan and inclination, this speed may vary somewhat, but generally the nuts should drop before they reach the 12 o'clock position, preferably at about the 10 o'clock position. Following the complete coating of the nuts, it will be observed that on removal from the revolving pan they are thoroughly and evenly coated, even the most irregular nuts.

The foregoing description of pre-dehydrating is a batch type method and can be made part of a continuous process. Similarly, the operation of coating the nutmeats can be done by using a commercial type screw or any type feed which advances nutmeats to be coated, rotating within a complementary barrel with provision for adding gum and spices, and directly feeding to the infrared tunnel.

FIGS. 1 and 2 show schematically the equipment and process which includes an infrared radiant heat tunnel 10 made of stainless steel with a stainless steel wire mesh belt 11 running through the center. About 6" below the belt 11 are placed in the first half of the tunnel 10 a bank of 16–1000 watt infrared generators 12 (8 on each side of the oven 10 below the belt 11) and 8–1000 watt infrared generators 12a down the center of the oven 10, about 12" above the belt for a total of 24–1000 watt generators. In the second half of tunnel 10 similarly positioned are 24 more infrared generators 13 and 13a of only 750 watts each. The entire tunnel 10 has a total of 48 infrared generators with parabolic reflectors 14 adapted to focus rays directly through the belt 11 and nuts 15. The generators 12, 12a, 13 and 13a are controlled by electric input controllers (not shown) from 100% to zero. One controller activates all thirty-two generators, 12 and 13 below the belt. Another controller activates all sixteen generators 12a and 13a above the belt. Thus in principal, there are two distinct areas of infrared radiation. The entrance to the tunnel 10 for the first 7½ feet carries 24×1000 watts (each with an output of 1625° F). The delivery end of the tunnel 10 for the second 7½ feet carries 24×750 watts each with an output of 1300° F. Thus the entire tunnel 10 is under very rigid control. The tunnel 10 is 15 feet long, 2 feet high and 3 feet wide.

Unlike convection resistor type heaters where air is the primary source of heat transfer, infrared is electric magnetic energy that is projected and radiated from a source to direct impingement on the nutmeats. Radiation is the transfer of heat by means of radiant energy and when absorbed, it becomes heat energy. Infrared generators have emission temperature ranges from 620° F. to 4073° F. The higher temperatures produce short wave length heat energy and the lower temperatures produce longer wave length energy. More of the energy carried by long wave length emissions is absorbed by the product resulting in higher efficiencies.

The generators used in the tunnel 10 have emission temperature of 1300° and 1625° F., which produce the longer wave lengths required for the process. The process uses reflecting surfaces in combination with high infrared reflection. When these are properly combined with a source rich in radiant component, high utilization of energy is possible. Efficiencies of 70% defined as heat in the nutmeat versus input energy are not uncommon.

Because the air is not the primary means of heat transfer, larger volumes of air are drawn through the tunnel 10 (indicated by the broken arrows in FIG. 1) which adds to greater efficiencies in operation and quality by driving off excess moisture and leaving a dry, crisp, clean product. The coating film (vegetable gum arabic) on which salt is of greater percentage and having a low specific heat, attains temperature quickly and aids in heat transfer by conduction from salt to nut.

When the molecular structure of the nut is altered or the organic structure is changed is not entirely clear, but whatever the change may be, the nutmeats are of high quality.

The following examples show preferred processes of utilizing the present invention.

EXAMPLE NO. 1

In processing dry roasted pecan halves, the nuts are placed in a revolving pan 16 in the raw state (when they are green and flexible) and gently wetted with gum arabic solution. The pan revolves at 18 r.p.m. and gently tumbles the nuts without any breakage. Salt and seasonings are added and the pan is run about 3 to 5 minutes more for a thorough coating. The whole pecan halves are then transferred to an infrared tunnel 10 with the stainless steel belt 11 running at a speed of 2 feet per minute. This allows the nuts to progressively move through the tunnel in 7 minutes. The tunnel controls are set with the top generators at 90% input and the bottom generators at 100%. In this Example No. 1, 50 lbs. of pecan halves having an initial moisture content of 4.5% are used. The moisture content of the nuts when finished is 0.5%.

EXAMPLE NO. 2

In processing dry roasted cashews, 250 lbs. of cashews are partially dry roasted in a commercial type dry roaster to a moisture content of 0.8% at a temperature of 325° F. for 18 minutes. Finishing weight at this stage is 240 lbs. This is equally divided into 3 parts of 80 lbs. each. 80 lbs. of these nuts are placed in revolving pan with speed of 18 r.p.m. and treated with a solution of gum arabic of 0.87 lb. gum arabic on a dry basis. After tumbling for about 2 minutes, 1.75 lbs. of commercial seasoning is added with 1.75 lbs. salt. This mix is tumbled for 3 minutes more to give a thorough even coating. Total time in the pan is 5 minutes. Nuts are then transferred to a stainless steel wire mesh belt running at speed of 5 feet per minute through a 15 ft. infrared heated tunnel (oven). The top controllers are set at 70% input and the bottom controllers are set at 80%. The nuts spend 3 minutes in the oven and emerge at a temperature of 200° F. On emerging from the tunnel, the nuts are cooled at 17 to 100° F. in 1 minute by a fan pulling air through the nuts. The moisture content of the finished nuts is 0.5%.

EXAMPLE NO. 3

300 lbs. balanced Virginia peanuts, with moisture content of 4.8%, are dry rosted in commercial type gas dry roaster to a moisture content of 1.3% at a temperature of 325° F. for 25 minutes. Finishing weight of the nuts is 290 lbs. The nuts are equally divided into 3 parts of 97 lbs. 97 lbs. of these nuts are placed in revolving pan as speed of 18 r.p.m. and treated with an aqueous solution of gum arabic or 0.87 lb. on a dry basis. After tumbling for about 2 minutes, 1.75 lbs. commercial seasoning is added with 1.75 lbs. salt. The nuts are tumbled for 2 minutes more to give a thorough even coating. The nuts are then transferred to a stainless steel wire belt running at a speed of 5 feet per minute through the 15 foot infrared tunnel. The upper controllers are set at 70% input and the bottom controllers are set at 90% input. The nuts travel through the oven in 3 minutes and reach a temperature of 250° F. On emerging from the tunnel, the nuts are cooled to 100° F. in 1 minute by pulling air through the nuts. The final moisture content of the nuts is 0.5%.

The gum arabic solution is formulated as follows:

⅔ water (by weight)
⅓ gum arabic (by weight)

The coating composition is prepared as follows:

0.87 lb. gum arabic solution (dry solids basis).
1.75 lbs. salt
1.75 lbs. commercial seasoning.

From 1 to 26 lbs. of nuts having an initial moisture content of about 3.5 to about 6.5% (as they enter the tunnel) can be used on each pass through the oven of 3 minute duration, or 520 lbs. per hour, maximum. The speed can vary from 3.75 to 5 feet per minute. The efficiencies of the upper generator is from 50 to 100%. The efficiencies of the lower generator is from 50 to 100%. The temperatures of the nutmeats entering the oven is about 150° F. to about 300° F.

The nutmeats can remain in the oven from 2 to 7 minutes. The nutmeats are cooled to a temperature of about 80° to 105° F.

The moisture content of the nutmeats leaving the oven is about 0.3 to about 0.7%.

The coating composition can contain from 30% to 40% gum arabic and salt and other seasonings as desired.

The upper generators are of 750 to 1000 wattage or 1000 to 1850° F. temperature and the lower generators are of 750 to 1000 wattage or 1000 to 1850° F. temperature. However, the temperature of the nutmeats themselves is the critical factor.

This invention is intended to cover all changes and modifications of the example of the invention herein chosen for purposes of the disclosure, which do not constitute departures from the spirit and scope of the invention.

What is claimed is:

1. A method of dry roasting pecans without losing volatile aromatic oils or breaking the pecans comprising the steps of:
   (a) coating green pecan nutmeats with a vegetable gum solution including salt,
   (b) positioning the coated nutmeats in a smooth flow path,
   (c) applying infrared heat from above and below the pecans to dry the coating on the pecans and simultaneously roast the pecans as the nutmeats progress along said path without breaking the nutmeats,
   (d) and recovering a dry roasted whole pecan nutmeat of good flavor and containing substantially all of the sweet volatile aromatic oils originally contained in the green nutmeat.

2. The method of claim 1 wherein the pecans have a temperature of about 65° to about 90° F. on entering the roast and a temperature of about 150° to about 300° F. on leaving.

3. The method of claim 1 including the step of recovering a roasted pecan of about 0.3 to about 0.8% moisture.

4. The method of claim 2 wherein the pecans are deposited on an open mesh belt and moved through the roast on the same.

5. The method of claim 1 wherein the pecans are coated with a gum arabic solution including spices in a rotating pan and the coated nutmeats are heated for about 2 to about 5 minutes.

References Cited

UNITED STATES PATENTS

| 2,020,533 | 11/1935 | Zaloom | 99—127 |
| 2,464,421 | 3/1949 | Torres | 99—68 |
| 2,468,078 | 4/1949 | Kelly | 99—127 |
| 2,582,188 | 1/1952 | Zaloom | 99—127 |

A. LOUIS MONACELL, *Primary Examiner.*

S. E. HEYMAN, *Assistant Examiner.*

UNITED STATES PATENT OFFICE
CERTIFICATE OF CORRECTION

Patent No. 3,383,220     May 14, 1968

Fred W. Arnold, Jr.

It is certified that error appears in the above identified patent and that said Letters Patent are hereby corrected as shown below:

Column 2, line 56, "fravity" should read -- gravity --. Column 3, line 57, "when" should read -- whether --. Column 4, line 28, "balanced" should read -- blanched --; between lines 64 and 65, insert -- oven is about 65°F. to about 90° F. and leaving the --.

Signed and sealed this 23rd day of September 1969.

(SEAL)
Attest:

Edward M. Fletcher, Jr.  WILLIAM E. SCHUYLER, JR.
Attesting Officer  Commissioner of Patents